United States Patent [19]
Green

[11] 3,820,114
[45] June 25, 1974

[54] TESTING DEVICE
[75] Inventor: Robert Leonard Green, Teddington, England
[73] Assignee: Granley Products Limited, London, England
[22] Filed: Oct. 4, 1972
[21] Appl. No.: 294,978

[30] Foreign Application Priority Data
Oct. 5, 1971  Great Britain .................... 46310/71

[52] U.S. Cl. .................................. 343/17.7, 343/7.7
[51] Int. Cl. .............................................. G01s 9/42
[58] Field of Search ............................ 343/7.7, 17.7

[56] References Cited
UNITED STATES PATENTS

| | | | |
|---|---|---|---|
| 2,605,459 | 7/1952 | Cook ............................ | 343/17.7 X |
| 2,655,651 | 10/1953 | Allen et al. .................... | 343/17.7 X |
| 2,995,748 | 8/1961 | Cole et al. ......................... | 343/17.7 |
| 3,090,955 | 5/1963 | Hubka et al. ..................... | 343/17.7 |
| 3,103,010 | 9/1963 | Heyser et al. ..................... | 343/17.7 |

*Primary Examiner*—Malcolm F. Hubler
*Attorney, Agent, or Firm*—Brumbaugh, Graves, Donohue & Raymond

[57] ABSTRACT

This invention is a testing device for a transmitting/receiving system for detecting movement due, for example, to an intruder or a fire, and is arranged to be automatically operated when the main system is switched on to perform a test that the transmitter and receiver are operating correctly by applying a test signal to be transmitted and by detecting whether the test signal is received at a distant location and also by testing that the test signal applied directly to the receiver gives an alarm signal.

6 Claims, 1 Drawing Figure

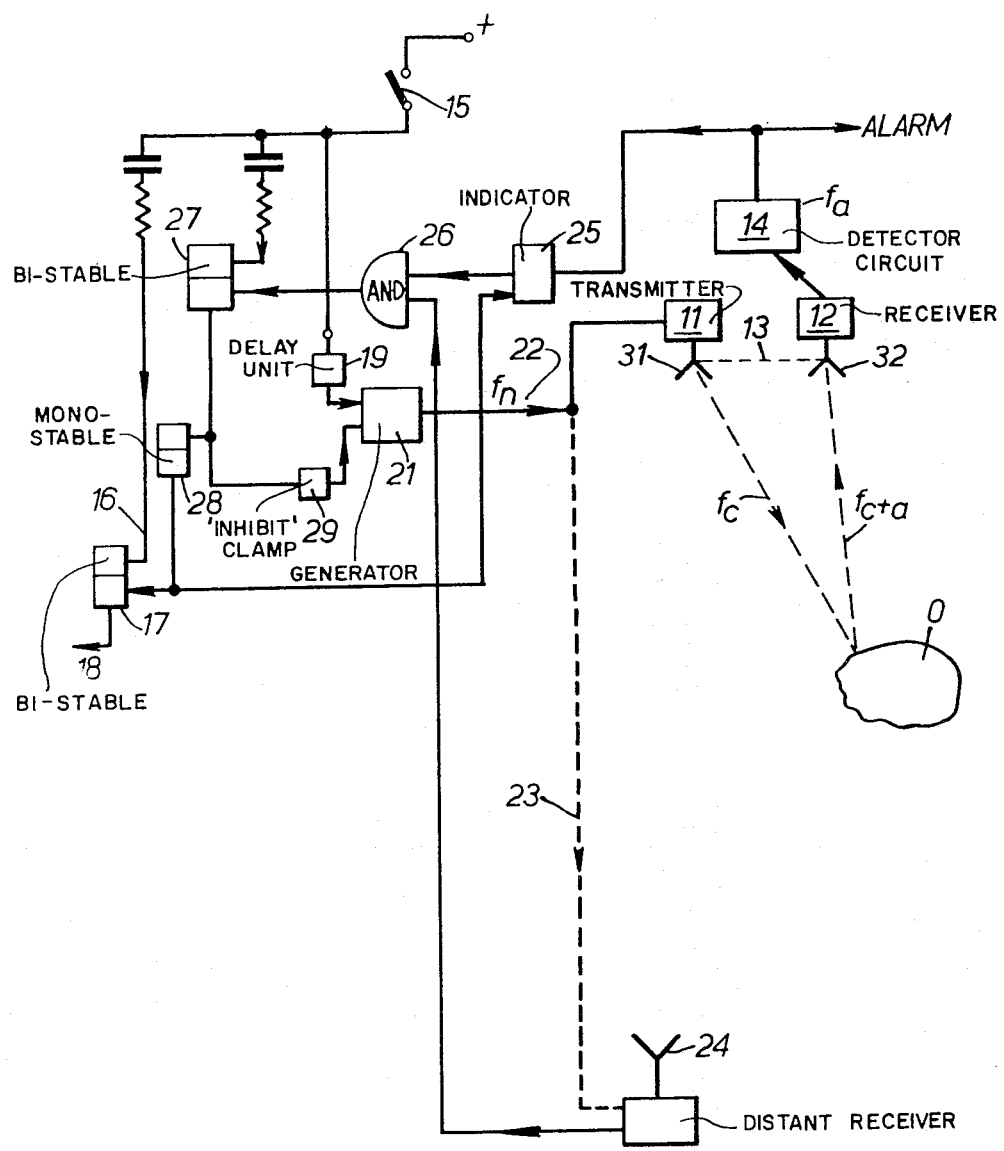

TESTING DEVICE

This invention relates to a testing device for a radio transmitting-receiving system (possibly using the Doppler effect) to detect a moving object in the field of operation to reflect to a local receiver signals received from a transmitter.

An object of the invention is to provide a simple means for testing that the equipment is operating correctly, preferably without requiring the user to perform a special test.

According to the invention, a testing device for a radio transmitting-receiving system, or audio or ultrasonic sound wave transmitting-receiving system, possibly using the Doppler effect, to detect a moving object, includes a transmitter and means for coupling a portion of the transmission signal to the receiver for the system, means for applying a test signal to be transmitted by the transmitter, and means for detecting whether the test signal is received at a distant location and whether a logical signal is produced indicating receipt of the test signal by the receiver.

The test signal may be applied for a short interval just for the purpose of testing, and may consist of an amplitude or other modulation of the normally-transmitted signal. It may be automatically applied when the system is switched on, and it may be arranged that a warning is given, or switching on of an intruder or fire alarm is inhibited if the test signal is not received by both receivers.

Thus, for example when an intruder alarm is switched on, a test will be automatically performed to check that the alarm is correctly operating. A distant receiver may be embodied in the system merely for the purpose of the test, and it can be assumed that if the distant receiver receives the test signal, the field of operation is not obscured, and that if the presence of the test signal at the local receiver is detected, the transmitter and receiver and detecting circuits are operating correctly.

Again the presence of an intruder may be simulated by incorporating a movable reflector which is used merely for testing, or indeed a gas discharge tube operating at an appropriate frequency can be used for the same purpose.

There may be several distant receivers at various positions near the limits of the field of operation of the system, and all can be tested together.

The invention may be carried into practice in various ways and one embodiment will be described by way of example with reference to the accompanying drawings, of which the single FIGURE is a sketch of a testing device for a DOPPLER-effect intruder detector.

The detector uses a transmitter 11 having an aerial 31 for transmitting signals in the X-band through the space to be protected, and a receiver 12 having an aerial 32 for receiving signals reflected from obstacles in the field. Some coupling is provided directly between the transmitter and receiver or between the aerials as indicated at 13. In operation, if a reflected signal is received from an obstacle O which has a component of movement directed towards the receiver, the reflected signal will have a frequency $f_{c+a}$, where the transmitted frequency is $f_c$. The receiver 12 receives the transmitted signal $f_c$ directly and a detector circuit 14 can detect whether a DOPPLER signal $f_a$ is present and use it for giving a warning, possibly with selector circuits for determining that it is a signal representative of a human being rather than, say, a mouse.

It is convenient to provide means for testing that the transmitter/receiver apparatus is operating correctly every time it is switched on, which may be each evening, and it is desirable that the tests be carried out automatically so that it will not be omitted merely by laziness on the part of the user.

For this purpose, when a main switch 15 is closed, it is arranged to initiate a test. When the switch 15 is closed, a signal is supplied at 16 to a bi-stable 17 which provides an inhibiting signal 18 to give a warning light and prevents switching on of the alarm system until the test has been completed. A signal is also provided through a delay unit 19 to operate a generator 21 of a burst of a test frequency signal having a frequency $f_n$, as indicated at 22.

The test signal is received at the receiver 12 directly through the coupling 13 and is detected by the detector circuit 14, indicating that the transmitter and receiver are both working. A logic signal is then fed through an indicator 25 to one input of an AND gate 26. A distant receiver 24 is positioned at a location near the ultimate range of the system and indeed there may be a number of distant receivers 24 all arranged to detect whether they are receiving the test frequency. The test frequency may also be supplied as indicated at 23 to the distant receiver 24, for recognition purposes so that a distant receiver will not give an erroneous signal in response to some extraneous or deliberate noises generated at the same time as the test.

The other input of the AND gate is received from the distant receiver 24 and if there are a number of receivers 24, they may each be separately connected to different inputs of the AND gate. Each such receiver connection supplies a logic signal to the gate 26 if the receiver 24 is receiving the signal from the transmitter since this shows that no screen has been put over the face of the aerials.

When the switch 15 is first closed, a bi-stable 27 is set and it can only be reset when it receives an output from the AND gate 26 indicating that both logic signals have been received and that the system is operating. Resetting of the bi-stable 27 sets a mono-stable 28 which in turn resets the bi-stable 17 to remove the visual indication and allow the main alarm system to be switched on.

At the same time, the resetting of the bi-stable 27 operates an 'inhibit' clamp 29 which causes the generator 21 to stop transmitting the test signal. Operation of the mono-stable 28 to reset the bi-stable 17 also resets the indicator 25.

Thus, once the switch 15 is closed, the test is automatically performed and if it indicates that the transmitter and receiver are operating correctly the warning light goes out and the alarm system is switched on without any other operation being required by the user. It will be appreciated that the transmitter 11 is normally continuously operating.

The indicator 25 which has just been described is of the self-latching kind. In an alternative arrangement, it could be a relay which was set in response to an alarm logic signal from 14 and was reset automatically when the input to it from 14 was removed. The reset connection to 25 and the mono-stable 28 would not be needed; bi-stable 17 would directly reset bi-stable 27.

The aerials 31 and 32 could for example be horns or dielectric probes.

What we claim as our invention and desire to secure by Letters Patent is:

1. In a transmitting and receiving system for detecting moving objects, the system including a receiver and a detector coupled to the receiver for detecting a signal received by the receiver indicative of a moving object and for providing a detector logic signal in response to receipt by the receiver of a signal indicative of a moving object, the improvement of a testing device comprising:
   a. a transmitter,
   b. means for supplying a test signal for transmission by the transmitter,
   c. means for coupling to the receiver of the detecting system a portion of the test signal transmitted by the transmitter,
   d. at least one distant receiver means for providing a distant receiver logic signal upon receiving the test signal, and
   e. means for detecting whether the test signal is received by the distant receiver means and whether the detector of the detecting system is providing a detector logic signal in response to receipt of the test signal by the receiver of the detecting system.

2. The improvement of claim 1, wherein the means for supplying a test signal operates for a short interval.

3. The improvement of claim 1, wherein the means for supplying a test signal operates automatically when the detecting system is switched on.

4. The improvement of claim 1, wherein the detecting means includes an AND device arranged to receive the detector logic signal and the distant receiver logic signal for controlling initiation of operation of the detecting system.

5. The improvement of claim 1, wherein the test signal is a simulation of a Doppler signal.

6. The improvement of claim 1, wherein the transmitter is a transmitter for the detecting system and is used during normal operation of the detecting system.

* * * * *